United States Patent [19]
Simpson

[11] 4,050,614
[45] Sept. 27, 1977

[54] VEHICLE LUGGAGE CARRIER

[76] Inventor: Earl L. Simpson, 6814 Farragut Ave., Falls Church, Va. 22042

[21] Appl. No.: 671,064

[22] Filed: Mar. 29, 1976

[51] Int. Cl.² .......................... B60R 9/04; B60R 9/06
[52] U.S. Cl. ............................ 224/29 R; 224/42.1 B; 224/42.1 E
[58] Field of Search ................. 224/58, 29 R, 42.1 E, 224/42.1 D, 42.1 B, 42.1 R

[56] References Cited

U.S. PATENT DOCUMENTS

| | | | |
|---|---|---|---|
| 2,983,413 | 5/1961 | Verwers | 224/42.1 B |
| 3,143,264 | 8/1964 | Spero | 224/42.1 E |
| 3,347,590 | 10/1967 | Bowen | 224/42.1 R X |
| 3,731,859 | 5/1973 | Bean | 224/42.1 E X |
| 3,752,375 | 8/1973 | Weigl | 224/29 R X |

FOREIGN PATENT DOCUMENTS 2,442,104  3/1975  Germany .................... 224/42.1 B Primary Examiner—L. J. Paperner
Assistant Examiner—Carl Rowold
Attorney, Agent, or Firm—Birch, Stewart, Kolasch and Birch

[57] ABSTRACT

A vehicle luggage carrier comprising a storage container having a front end portion, a rear end portion and lateral side portions, at least one front hook-type means operatively associated with the front end portion of the said storage container for engaging a portion of the vehicle and lateral hook-type means operatively associated with each side of said storage container for engaging lateral portions of said vehicle, said front and lateral hook-type means securing said storage container to said vehicle.

13 Claims, 5 Drawing Figures

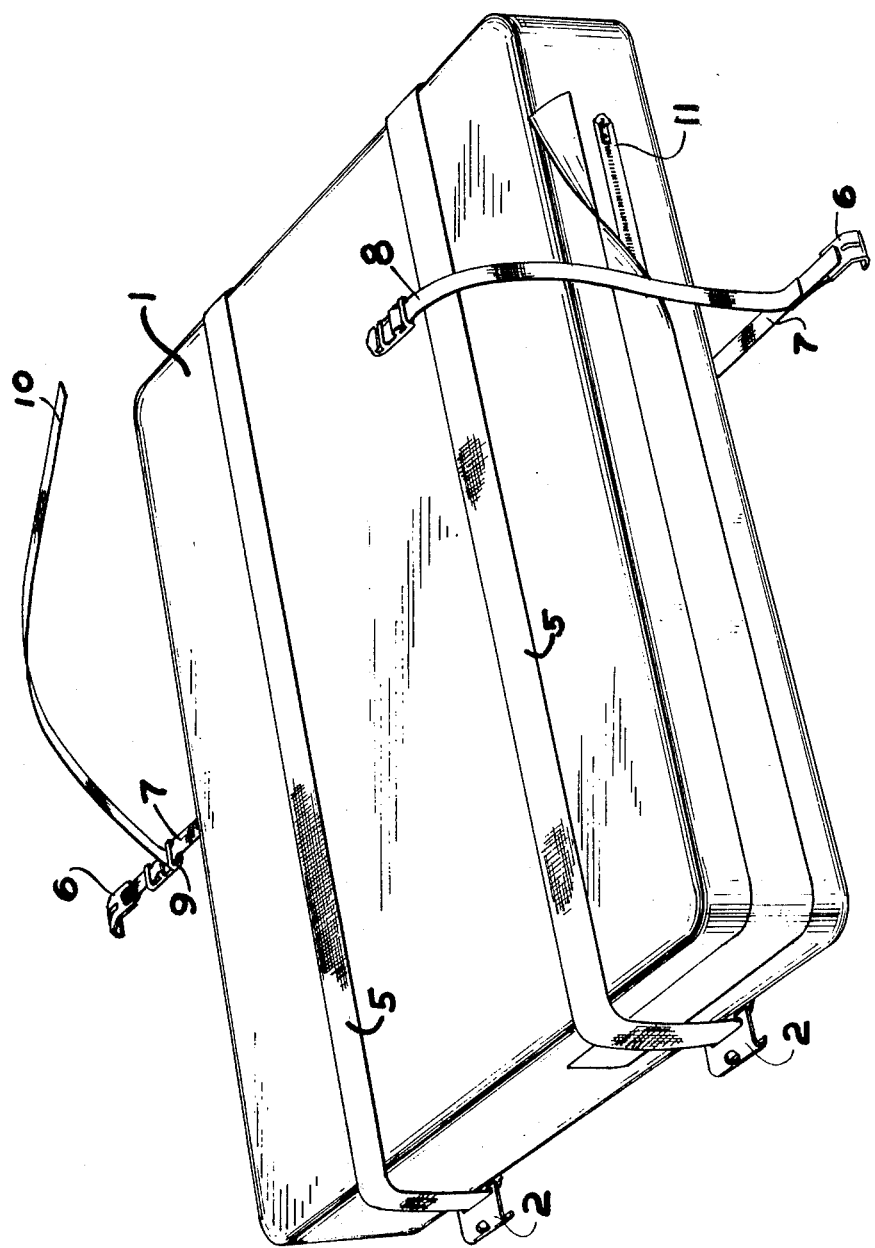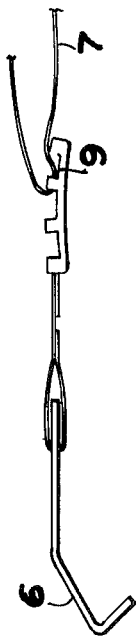

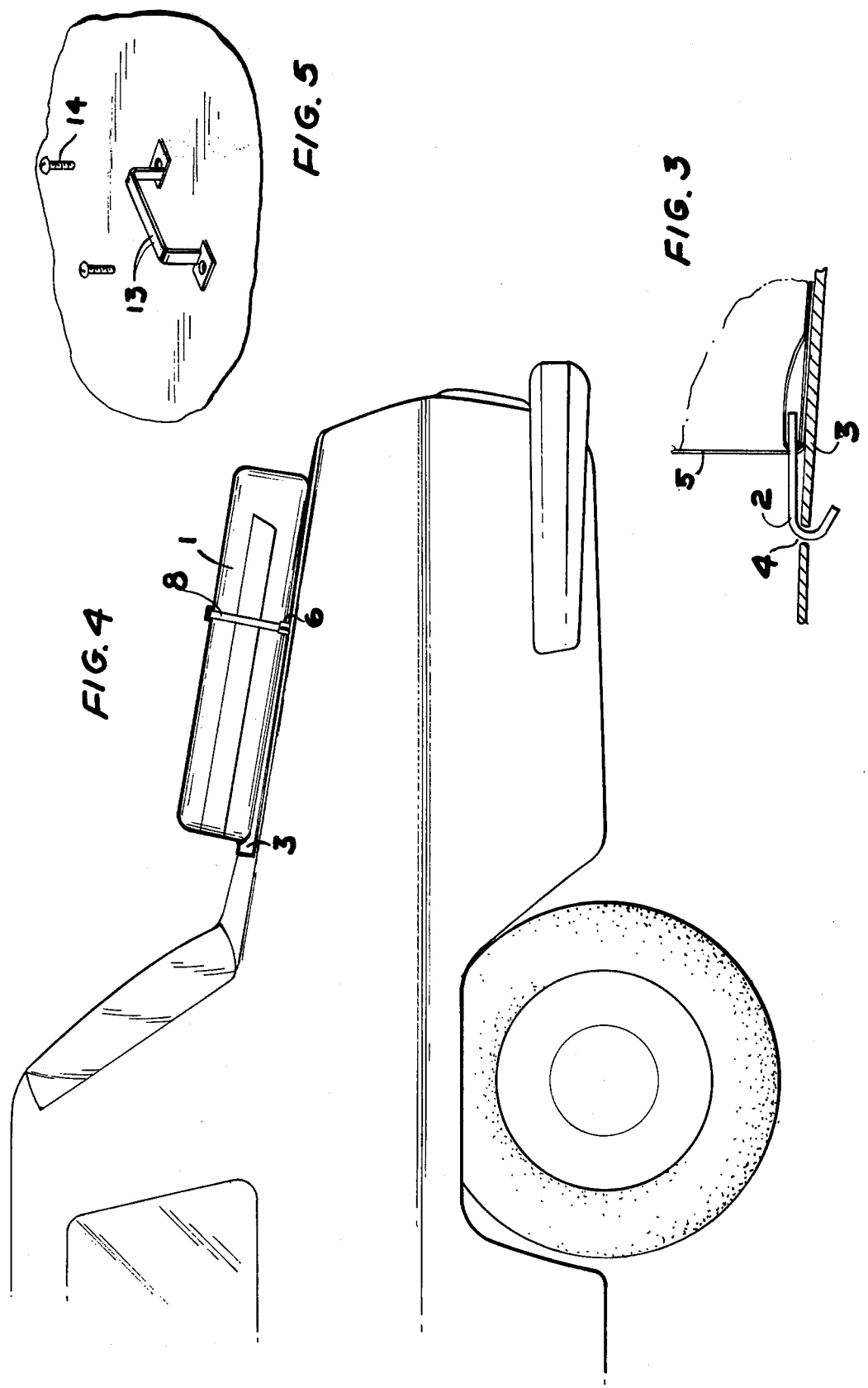

VEHICLE LUGGAGE CARRIER

BACKGROUND AND SUMMARY OF THE INVENTION

The present invention relates to a vehicle luggage carrier which can be readily attached to and disengaged from a vehicle. More particularly, the present invention is directed to a vehicle luggage carrier which can be adaped for use with any type of vehicle for supplementing the vehicle's luggage-carrying capacity.

A number of supplemental storage containers for use with vehicles, for example, automobiles, are well known in the art. In some instances, luggage carriers are specifically designed for use with a particular make of vehicle and thus said luggage carriers cannot be utilized in connection with different makes of vehicles. Thus, if the owner of such a specific vehicle sells said vehicle and purchases either a new vehicle of the same manufacturer or a vehicle produced by a different manufacturer, it is necessary to purchase a completely new storage container which is designed specifically for the new vehicle.

In many other cases, the luggage carrier is very difficult to attach or remove from the vehicle and frequently the storage containers are very complicated, making their manufacture very expensive.

Furthermore, because of the energy crisis, and more particularly, the fuel shortage recently experienced in the United States, there has been a dramatic shift in ownership from the big American vehicle to the smaller economy-sized vehicle. This is dramatized by the substantial increase in sales of the smaller, more economical automobiles. To compete with this foreign market, the U.S. manufacturers are producing a large number of small, economy-type automobiles. However, it is readily recognized when a shift is made from the large-sized vehicle to the smaller-sized vehicle, there is a corresponding loss in the luggage-carrying capacity of the particular vehicle. Accordingly, it would be very desirable to provide a storage container to not only supplement the loss of luggage-carrying capacity, but also to provide one which can be readily secured to and detached from a vehicle, for example, an automobile, whether it be manufactured in the United States or abroad.

Accordingly, an object of the present invention is to provide a storage container which can be readily attached to and disengaged from a vehicle, for example, an automobile.

Another object of the present invention is to provide an improved storage container which can be readily attached to and detached from any make and size of vehicle.

A further object of the present invention is to provide an improved storage container which is inexpensive and relatively simple in its construction while at the same time solving a serious problem experienced by vehicles requiring supplemental luggage-carrying capacity.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above disadvantages have been eliminated and a much improved vehicle luggage carrier has been developed which can be readily attached to and disengaged from all types of vehicles, irrespective of size and manufacturer. According to the present invention, the vehicle luggage carrier comprises a storage container which is provided with hooks at the front end thereof for engaging the trunk lid of a vehicle in the area of the hinges, and in addition, lateral hooks are provided on both sides of the storage container for engaging the lateral sides of the trunk lid of the vehicle. For vehicles which do not contain trunks or wherein the trunks are not suitable for engagement with the hooks attached to the storage container, U-shaped brackets can be fixedly attached to the top of the vehicle and are adapted for engagement with the hooks which are attached to one end of the storage container. In this instance, the lateral hooks which extend from the side of the storage container can be secured to the weather stripping on both sides of the vehicle roof. Strap means are operatively associated with the lateral hooks for securing the storage container to either the trunk lid or to the top of the vehicle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 shows, in a perspective view, the vehicle luggage carrier of the present invention;

FIG. 2 shows, in greater detail, one of the lateral hook-type members utilized in FIG. 1;

FIG. 3 shows, in greater detail, the manner in which the hooks disposed at the front of the storage container engage with the trunk lid in the area of the hinges for the trunk;

FIG. 4 shows the storage container of the present invention secured to the trunk lid of a vehicle; and FIG. 5 shows a typical U-shaped bracket which can be affixed to the roof of a vehicle for engagement with the hooks which are attached to the front portion of the storage container.

DESCRIPTION OF THE PREFERRED EMBODIMENTS

The present invention will now be more specifically described with reference to the attached drawings and specific reference to FIG. 1 in which the storage container 1 is provided with two front hooks 2 disposed at the front end portion of the storage container. Although the use of a single front hook would be sufficient, it is readily apparent that the use of two front hooks provides better overall stability in securing the storage container to the trunk lid. The front hooks 2 are adapted to engage the trunk lid 3 in the hinge area of the trunk 4 as shown in FIG. 3. The hooks 2 can be attached directly to the storage container or, alternatively, can be attached to straps which are, in turn, attached to the storage container. In the latter instance, these straps can be provided with means for increasing or decreasing their length, such as for example, buckle means, and accordingly, the distance at which the storage container is extended from the hooks 2 can be varied depending upon the particular size and shape of the vehicle. FIG.

1 shows the embodiment of the present invention wherein the front hooks are attached to straps 5. According to the present invention, lateral hooks are also provided for securing the storage container to the sides of the trunk lid, said lateral hooks 6 being operatively associated with side straps 7 which extend from both sides of the storage container. Advantageously, the side straps are attached to the storage container on the bottom side thereof. On one side of the storage container the side strap 7 is fixedly attached to the lateral hooks 6 and extends to the top portion of the storage container as free end portion 8. On the other side of the storage container, the side strap 7 loops through an aperture 9 provided in the lateral hook 6 and extends to the upper portion of the storage container as free end portion 10. The free end portions 8 and 10 can be provided with any type of means for securing said free end portions together. FIG. 1 also shows use of a lateral zipper 11 to enable one to conveniently introduce into and remove luggage from the storage container. A flap 12 is disposed above the zipper in order to not only cover the zipper, but also to protect it from the environment. It is readily apparent that the zipper 11 may be replaced with any type of closure means, for example, buttons, snaps, and the like.

FIG. 5 shows a type of U-shaped bracket which can be permanently attached to the roof of a vehicle as an alternative way for securing the storage container to a vehicle. In this instance, two U-shaped brackets 13 are attached to the front end portion of the vehicle hood with screws 14, said brackets being spaced apart from each other the same distance as the front hooks 2 are spaced apart from each other on the storage container.

The vehicle luggage carrier of the present invention is fixed to a vehicle, for example an automobile, in the following manner:

In the case where the storage container is attached to the trunk lid of an automobile, the trunk lid is first raised slightly in order to provide an aperture at the hinge portion of the trunk lid. Then the forward hooks 2 are engaged in said aperture around the edge of the trunk lid. In a similar manner, the lateral hooks are engaged around the lateral sides of the trunk lid and the side straps are pulled until said straps become taut. Then, the trunk lid is closed, securing both the front hooks and the lateral hooks underneath the trunk lid between the trunk lid and the body of the vehicle. Then, by pulling on the free end portion 10 of the side straps 7, the side straps are further tightened with the free end portions 8 and 10 being secured to each other on top of the storage container to further secure the storage container to the trunk lid of the vehicle.

When it is desired to attach the vehicle luggage carrier to the top of a vehicle, the U-shaped brackets 13 are first permanently attached to the top of the vehicle and then the storage container is mounted to the top by first engaging the forward hooks 2 in said brackets 13 and engaging the lateral hooks 6 around the weather stripping on the lateral sides of the roof of the vehicle. Then the side straps 7 and the free ends 8 and 10 thereof are secured in the same manner as when the storage container is attached to the trunk.

Although the storage container 1 is shown as having fairly rigid and defined surfaces, it is readily apparent that the storage container can have any desired shape and can be made of any type of material, advantageously a water-proof material. It is particularly advantageous if the storage container is flexible in nature and does not have rigid surfaces because such a container makes it possible to store a larger quantity of clothing, luggage, and the like therein.

It should be recognized that the storage container of the present invention does not require the use of means for attaching the rear portion of the container to the vehicle. The reason for this is that when the vehicle is moving a force is produced toward the rear of the vehicle due to said motion and also due to the weight of the material stored in the container. This rearward force puts tension on the forward hooks 2 and thus provides ample stability to the storage container.

The invention being thus described, it will be obvious that the same may be varied in many ways. Such variations are not to be regarded as a departure from the spirit and scope of the invention, and all such modifications as would be obvious to one skilled in the art are intended to be includes within the scope of the following claims.

It is claimed:

1. A vehicle luggage carrier comprising a storage container having a front end, a rear end, lateral side portions, a top side and a bottom side, means for opening and closing said storage container, at least one front hook-type means operatively associated with the front end of said storage container for engagement with a portion of the vehicle, side straps attached to said storage container and extending laterally from each lateral side portion of the storage container, lateral hook-type mens operatively attached to said side straps for engagement with lateral portions of said vehicle, one of said lateral hook-type means being fixedly attached to a side strap on one side of said storage container with the free end of said side strap extending to the top side of the storage container, the other of said lateral hook-type means being slidably attached to a side strap on the other side of said storage container with the free end of said side strap extending to the top side of the storage container and means for securing said free ends of said straps together on the top side of said storage container, so that tightening the strap results in simultaneously tightening the lateral hook-type means in their lateral directions and the storage container in the vertical direction, relative to the vehicle.

2. The vehicle luggage carrier of claim 1, wherein the front, hook-type means is attached directly to the storage container.

3. The vehicle luggage carrier of claim 1, wherein the front, hook-type means is attached to a longitudinal strap which is, in turn, attached to the storage container.

4. The vehicle luggage carrier of claim 3, wherein means are provided for adjusting the length of said longitudinal strap.

5. The vehicle luggage carrier of claim 3, wherein two longitudinal straps are attached to the storage container and two front hook-type means are attached to said longitudinal straps.

6. The vehicle luggage carrier of claim 5, wherein two, U-shaped brackets are provided for attachment to the vehicle and the front hook-type means are adapted to engage said brackets.

7. The vehicle luggage carrier of claim 1, wherein two front, hook-type means are operatively associated with the front end portion of the storage container.

8. The vehicle luggage carrier of claim 1, wherein at least one U-shaped bracket is provided for attachment to the vehicle and the front, hook-type means is adapted to engage said bracket.

9. The vehicle luggage carrier of claim 1, wherein one of said lateral hook-type means is provided with a slot through which the side strap is threaded to provide said slidable attachment thereto.

10. The luggage carrier of claim 9, wherein the securing means is fixedly attached to the free end of one of said side straps, said securing means also containing slot means for receiving the free end of said other side strap in securing, engaging relationship.

11. The vehicle luggage carrier of claim 9, wherein said means for opening and closing said storage container is a zipper means, and a flap means is disposed above the zipper means and extends over the zipper means to protect it from the environment.

12. The vehicle luggage carrier of claim 9, wherein the side straps are attached to the bottom side of the storage container.

13. The vehicle luggage carrier of claim 9, wherein the storage container is made of a flexible, water-proof material.

* * * * *